A. L. ZIMMERMAN.
CLUTCH RELEASE.
APPLICATION FILED NOV. 30, 1914.
1,188,130.
Patented June 20, 1916.
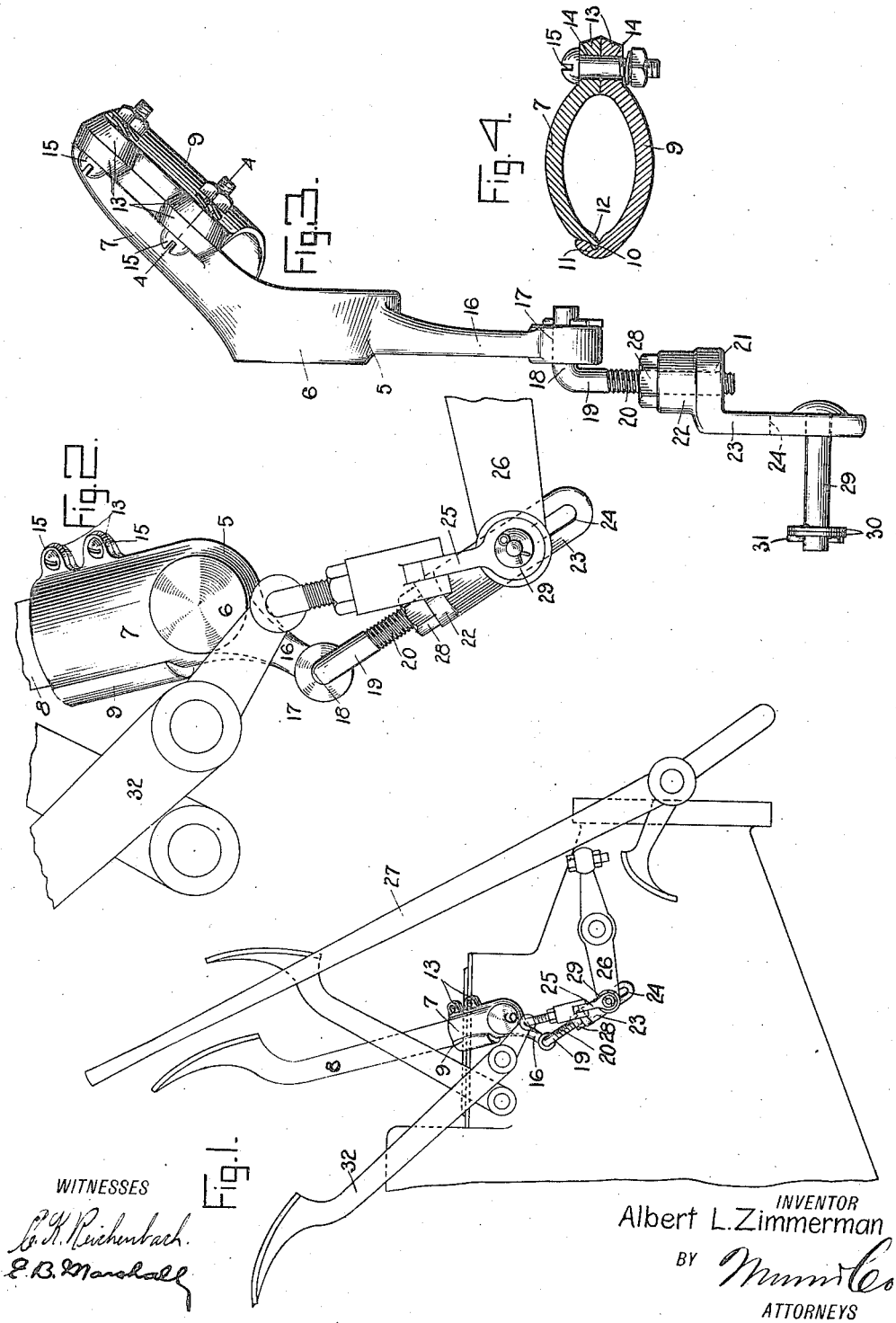
WITNESSES
INVENTOR
Albert L. Zimmerman
BY
ATTORNEYS

UNITED STATES PATENT OFFICE.

ALBERT LEWIS ZIMMERMAN, OF VALPARAISO, INDIANA.

CLUTCH-RELEASE.

1,188,130.   Specification of Letters Patent.   Patented June 20, 1916.

Application filed November 30, 1914. Serial No. 874,722.

*To all whom it may concern:*

Be it known that I, ALBERT L. ZIMMERMAN, a citizen of the United States, and a resident of Valparaiso, in the county of Porter and State of Indiana, have invented a new and Improved Clutch-Release, of which the following is a full, clear, and exact description.

My invention has for its object to provide a clutch release for automobiles and particularly of the Ford type, which connects the brake pedal with the clutch lever, with which the clutch pedal is also connected. The brakes are applied in the usual way by the operation of the brake pedal and at the same time my release throws the clutch mechanism into inoperative position.

Still further objects of the invention will appear in the following specification, in which the preferred form of my invention is described.

In the drawings similar reference characters refer to similar parts in the several views, in which—

Figure 1 is a diagrammatic view, showing how my clutch release is applied to a Ford car; Fig. 2 is an enlarged view showing how the clutch release is clamped to the brake pedal and slotted link of the release is connected with the clutch lever; Fig. 3 is a view showing my clutch release; and Fig. 4 is a sectional view on the line 4—4 of Fig. 3.

By referring to the drawings, it will be seen that a connecting member 5 is provided having a head 6, which is normally disposed at the end of the brake pedal, the connecting member 5 having a clamp member 7 which is disposed at one side of the brake pedal 8, a companion clamp member 9 being provided for coöperating with the clamp member 7, to secure the connecting member 5 to the said brake pedal 8. As will best be seen by referring to Fig. 4 of the drawings, the clamp member 9 has a groove 10 adjacent its side 11, a tongue 12 on the clamp member 7 being disposed in this groove 10. The clamp members 7 and 9 are provided with the customary ears 13 having orifices 14, in which bolts 15 are disposed for holding the clamp members relatively to each other.

Extending from the connecting member 5 there is an arm 16 having a transverse bearing 17, in which is disposed a bent end 18 of a bolt 19. The bolt 19 has a thread 20 which meshes in the threaded orifice 21 in the setoff portion 22 of the link 23, the link 23 having a slot 24.

When the connecting member 5 has been secured to the brake pedal 8 in the manner which has been described, the pin or bolt which ordinarily connects the link 25 with the clutch lever 26 is removed and the emergency brake lever 27 is moved forward as far as possible, the position being shown in Fig. 1 of the drawings. This having been done, the lock nut 28 which meshes with the thread 20 on the bolt 19 is turned on the bolt 19 as far as possible in the direction of the bent end 18, the link 23 then being turned on the thread 20 of the bolt 19 until the bolt or pin 29, which is best shown in Fig. 3 of the drawings, may be disposed through the orifice in the link 25, the orifice in the lever 26 and also through the slot 24 in the link 23, at the upper end of the slot. The bolt or pin 29 is provided with the customary washers 30 with a keeper pin 31, which is provided for holding the bolt or pin 29 in position and the washers 30 on the bolt or pin.

The release having been adjusted in the manner described, it is tested by operating the brake pedal 8 to ascertain whether it operates the link 25 which is connected in the customary manner to the clutch pedal 32. If it is found that the operation of the brake pedal 8 operates the clutch pedal 32 by means of the release, the lock nut 28 is turned home. The emergency brake lever 27 is then operated and the motor is started to further test the clutch to see whether it will hold. If the clutch does not hold, the link 23 should be moved up farther on the bolt 19 in a manner readily understood and the brakes should then be applied to see whether they are effective. If not, the brake band should be tightened until it works satisfactorily.

Having thus described my invention, I claim as new and desire to secure by Letters Patent:—

1. In an article of the class described, an arm with a transverse bearing, means for securing the arm to a lever, a slotted link having a threaded orifice, the axis of which is disposed longitudinally of the slot, and a threaded bolt having a bent end journaled in the bearing, the thread on the bolt meshing in the threaded orifice in the slotted link.

2. In combination with a brake pedal, a clutch pedal, a clutch lever, means connecting the clutch pedal with the clutch lever, a clamp secured to the brake pedal, a bolt articulated to the clamp, a link having a transverse slot, secured to the bolt, and a bolt secured to the clutch lever and disposed in the slot.

3. In combination with a brake pedal, a clutch pedal, a clutch lever, means connecting the clutch pedal with the clutch lever, a clamp secured to the brake pedal, a threaded bolt secured to the clamp, a link having a transverse slot and a threaded orifice in which the thread on the bolt meshes, and a bolt secured to the clutch lever and disposed in the slot.

4. In an article of the class described, a connecting member having a clamp, set off at one side and an arm with a transverse bearing, a slotted link having a threaded orifice, the axis of which is disposed longitudinally of the slot, and a threaded bolt having a bent end journaled in the bearing, the thread on the bolt meshing in the threaded orifice in the slotted link.

5. In an article of the class described, an arm with a transverse bearing, means for securing the arm to a pedal, a link, means journaled in the bearing and secured to the link, and means for securing the link to a clutch lever.

6. In combination with a brake pedal, a clutch pedal, a clutch lever, and means connecting the clutch pedal with the clutch lever, a connecting member having a clamp set off at one side and secured to the brake pedal, the connecting member also having an arm with a transverse bearing, a slotted link having a threaded orifice, the axis of which is disposed longitudinally of the slot, a threaded bolt having a bent end journaled in the bearing, the thread on the bolt meshing in the threaded orifice in the slotted link, and a bolt secured to the clutch lever and disposed in the slot in the link.

7. In combination with a brake pedal, a clutch pedal, a clutch lever, means connected with the clutch pedal, a clamp secured to the brake pedal, a slotted link, means connecting the slotted link with the clamp, and a bolt connecting the said first means with the clutch lever and disposed in the slot.

8. In an article of the class described, a clamp, a threaded bolt secured to the clamp, and a link having a transverse slot extending through a side thereof and a threaded orifice in which the thread on the bolt meshes.

In witness whereof I have signed my name to this specification in the presence of two subscribing witnesses.

ALBERT LEWIS ZIMMERMAN.

Witnesses:
GROVER CLEVELAND MARTIN,
ALBERT RAY HAVENS.